United States Patent
Zhao et al.

(10) Patent No.: US 8,296,749 B2
(45) Date of Patent: Oct. 23, 2012

(54) PROGRAM TRANSLATION AND TRANSACTIONAL MEMORY FORMATION

(75) Inventors: Chengyan Zhao, San Jose, CA (US); Cheng Wang, San Jose, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1132 days.

(21) Appl. No.: 11/966,453

(22) Filed: Dec. 28, 2007

(65) Prior Publication Data

US 2009/0172654 A1    Jul. 2, 2009

(51) Int. Cl.
*G06F 9/45* (2006.01)
(52) U.S. Cl. .................. 717/158; 717/127
(58) Field of Classification Search .......... 717/124–133, 717/154–158
See application file for complete search history.

(56) References Cited

U.S. PATENT DOCUMENTS 6,374,367 B1 * 4/2002 Dean et al. ............. 714/37
7,725,885 B1 * 5/2010 Pradhan et al. ........... 717/148

OTHER PUBLICATIONS

Zhang et al., "An Event-Driven Multithreaded Dynamic Optimization Framework", Sep. 2005, In Proceedings of the International Conference on Parallel Architectures and Compilation Techniques, pp. 1-12.*
Weifeng Zhang, "Event-Driven Multithreaded Dynamic Optimization", 2006, A thesis, University of California, San Diego, 192 pages.*

* cited by examiner

*Primary Examiner* — Ted T Vo
(74) *Attorney, Agent, or Firm* — Trop, Pruner & Hu, P.C.

(57) ABSTRACT

Disclosed are methods, machine readable medium and systems that dynamically translate binary programs. The dynamic binary translation may include identifying a hot code trace of a program. The translation may further include determining a completion ratio for the hot code trace. The translation may also include packaging the hot code trace into a transactional memory region in response to the completion ratio having a predetermined relationship to a threshold ratio.

18 Claims, 4 Drawing Sheets

310 ～ 3EC1: xorl %eax,%eax ～START
      3EC3: jmp 0x3ECA ～ABORT

3ECA: testl %eax,%eax
3ECC: je 0x3F4B
3F4B: pushl %ebp

3F4C: movl 0x20(%esp),%eax
3F50: pushl %eax
3F51: pushl $0x1
3F57: pushl %edx
3F58: call 0x4598

4598: pushl %edi
4599: pushl %esi
459A: pushl %ebp
459B: pushl %ebx
459C: pushl %esi
459D: movl 0x18(%esp),%ebp
45A1: testl %ebp,%ebp
45A3: movl 0x1C(%esp),%ebx
45A7: movl 0x20(%esp),%esi
45AB: movl 0x24(%esp),%edi
45AF: movl 0x99B30,%edx
45B5: leal 0x1(%edx),%eax
45B8: movl %eax,0x99B30
320 ～ 45BD: jne 0x45CA ～COMMIT

FIG. 3

345 ～ B0747: nop ～START
340 ～ B0748: addl $0x8,%ebp
      B074B: addl $0x1,%ebx
      B074E: addl $0x8,%ecx
      B0751: cmpl $0x38,%ecx
      B0754: je 0xB06FE B06FE: movl 0x1AE2BC(%ecx),%eax
B0704: movl 0x14(%esp),%edx
B0708: movl $0x1,%edi
B070D: notl %edx
B070F: testl %eax,%edx
320 ～ B0711: jne 0xB0748 ～COMMIT B0713: movl %ebx,0x30(%esp)
B0717: leal 0xFFFFFFFFFFFFFFFF(%edi),%esi
B071A: leal 0x1(%esi),%edx
B071D: addl $0x1,%esi
B0720: addl $0x1,%edi
B0723: cmpl $0x2,%edi
310 ～ B0726: jg 0xB0BE2 ～ABORT
      B072C: movl 0x10(%esp,%edi,4),%ebx
      B0730: notl %ebx
      B0732: testl %ebx,0x1AE2B8(%ebp,%edi,4)
      B0739: je 0xB071A

. . .

B0BCE: movl 0x24(%esp),%eax
B0BD2: movl 0x2C(%esp),%edx
B0BD6: movl %ebx,0x1AE1E0(%eax,%edx,4)
330 ～ B0BDD: jmp 0xB0748

FIG. 4

```
380 ── 31B5F: nop ──START
375 ── 31B60: movl (%eax),%ecx
       31B62: movl $0xFFFFFFFFFEFEFEFF,%edi
       31B67: xorl %edx,%ecx
       31B69: addl %ecx,%edi
310 ── 31B6B: jae 0x31C75 ── ABORT 31B71: xorl %ecx,%edi
       31B73: orl $0xFFFFFFFFFEFEFEFF,%edi
       31B79: incl %edi
310 ── 31B7A: jne 0x31C75 ── ABORT 31B80: movl 0x4(%eax),%ecx
       31B83: movl $0xFFFFFFFFFEFEFEFF,%edi
       31B88: xorl %edx,%ecx
       31B8A: addl %ecx,%edi
310 ── 31B8C: jae 0x31C72 ── ABORT 31B92: xorl %ecx,%edi
       31B94: orl $0xFFFFFFFFFEFEFEFF,%edi
       31B9A: incl %edi
310 ── 31B9B: jne 0x31C72 ── ABORT 31BA1: movl 0x8(%eax),%ecx
       31BA4: movl $0xFFFFFFFFFEFEFEFF,%edi
       31BA9: xorl %edx,%ecx
       31BAB: addl %ecx,%edi
310 ── 31BAD: jae 0x31C6F ── ABORT

. . .

31BD4: xorl %ecx,%edi
       31BD6: orl $0xFFFFFFFFFEFEFEFF,%edi
       31BDC: incl %edi
310 ── 31BDD: jne 0x31C6C ── ABORT 31BE3: addl $0x10,%eax
       31BE6: subl $0x10,%esi
370 ── 31BE9: jae 0x31B60
320 ── 31BEB: nop ── COMMIT
```

FIG. 5

```
395 ── 3FA8C: addl $0x4,%esi
       3FA8F: movl (%esi),%ebx
       3FA91: testl %ebx,%ebx
310 ── 3FA93: je 0x3FA31

390 ── 3FA95: cmpw (%ebx),%di
       3FA98: jne 0x3FA8C
```

FIG. 6A

```
       3FA8B: nop ── START
395 ── 3FA8C: addl $0x4,%esi
       3FA8F: movl (%esi),%ebx
       3FA91: testl %ebx,%ebx
310 ── 3FA93: je 0x3FA31 ── ABORT 3FA95: cmpw (%ebx),%di
       3FA98: je 0x3FA91

3FA8C': addl $0x4,%esi
       3FA8F': movl (%esi),%ebx
       3FA91': testl %ebx,%ebx
310 ── 3FA93': je 0x3FA31 ── ABORT 3FA95': cmpw (%ebx),%di
       3FA98': je 0x3FA91

. . .

3FA8C'': addl $0x4,%esi
       3FA8F'': movl (%esi),%ebx
       3FA91'': testl %ebx,%ebx
310 ── 3FA93'': je 0x3FA31 ── ABORT 390 ── 3FA95'': cmpw (%ebx),%di
       3FA98'': jne 0x3FA8C
320 ── 3FA9A'': nop ── COMMIT
```

PROGRAM TRANSLATION AND TRANSACTIONAL MEMORY FORMATION

BACKGROUND

Historically, processor performance has been greatly influenced by creating processors that operate at higher frequencies. Due to various thermal and power related problems encountered as a result of higher operating frequencies, the industry has recently shifted away from increasing the operating frequency of the processor toward increasing the number of processing cores per a processor. Software generally needs to be designed for multiple threads of execution and/or other forms of parallelization in order to take full advantage of the processing power provided by multiple processing cores. However, much of the software on the market has been designed for systems having a single processor that has a single core. As a result, much of the current software is unable to take full advantage of processors having multiple processing cores and is thus unable to fully enjoy the benefit of the increased processing power of such processors.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 shows a hot trace without a loop.

FIG. 4 shows a hot trace with an unconditional loop.

FIG. 5 shows a hot trace with a conditional loop.

FIG. 6A show a hot trace having a loop and fewer than a threshold number of instructions.

FIG. 6B shows the hot trace of FIG. 6A with the loop unrolled to increase the number of instructions of the hot trace.

DETAILED DESCRIPTION OF THE DRAWINGS

Figure 1:
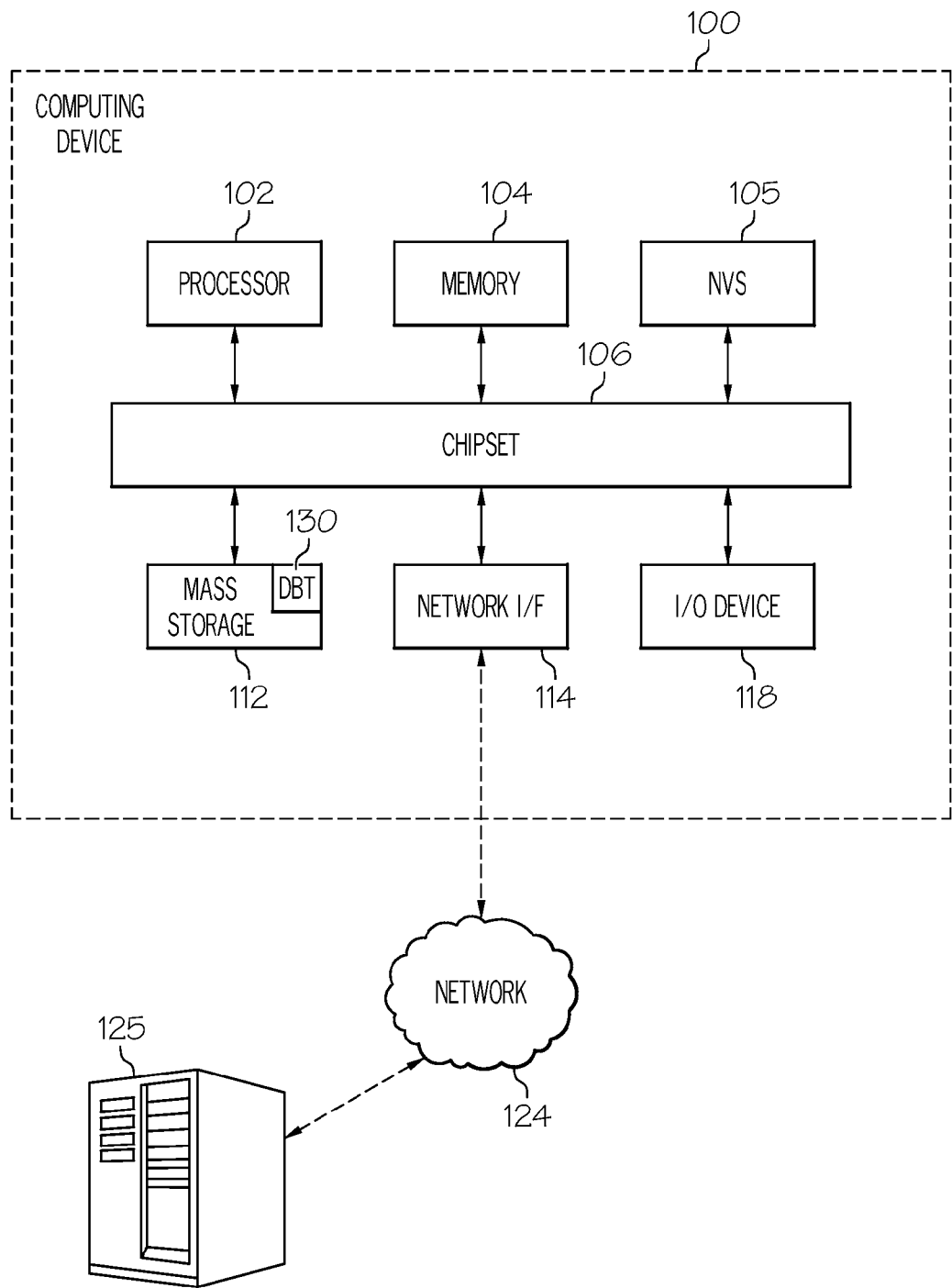
FIG. 1 shows a computing device suitable for executing a dynamic binary translator.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a non-transitory machine-readable medium, which may be read and executed by one or more processors. A non-transitory machine-readable medium may include any non-transitory mechanism for storing or transmitting information in a non-transitory form readable by a machine (e.g., a computing device). For example, a non-transitory machine-readable medium may include read only memory (ROM); random access memory (RAM); magnetic disk storage media; optical storage media; flash memory devices; and others.

Referring now to FIG. 1, one embodiment of a computing device 100 is shown. The computing device 100 may include a processor 102 and a memory 104 coupled to a chipset 106. A mass storage device 112, a non-volatile storage (NVS) device 105, a network interface (I/F) 114, and an Input/Output (I/O) device 118 may also be coupled to the chipset 106. Embodiments of computing device 100 include, but are not limited to, a desktop computer, a notebook computer, a server, a personal digital assistant, a network workstation, or the like. In one embodiment, the processor 102 may execute instructions stored in memory 104.

The processor 102 may include, but is not limited to, processors manufactured or marketed by Intel Corp., IBM Corp., and Sun Microsystems Inc. In one embodiment, computing device 100 may include multiple processors 102. The processors 102 may also include multiple processing cores. Accordingly, the computing device 100 may include multiple processing cores for executing binary code of the computing device 100.

The memory 104 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, the memory 104 may include one or more memory units that do not have to be refreshed.

The chipset 106 may include a memory controller, such as a Memory Controller Hub (MCH), an input/output controller, such as an Input/Output Controller Hub (ICH), or the like. In an alternative embodiment, a memory controller for memory 104 may reside in the same chip as processor 102. The chipset 106 may also include system clock support, power management support, audio support, graphics support, or the like. In one embodiment, chipset 106 is coupled to a board that includes sockets for processor 102 and memory 104.

The components of computing device 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 118 may include a keyboard, a mouse, a display, a printer, a scanner, or the like.

The computing device 100 may interface to external systems through network interface 114. The network interface 114 may include, but is not limited to, a modem, a Network Interface Card (NIC), or other interfaces for coupling a computing device to other computing devices. A carrier wave signal 123 may be received/transmitted by network interface 114. In the embodiment illustrated in FIG. 1, carrier wave signal 123 is used to interface computing device 100 with a network 124, such as a Local Area Network (LAN), a Wide Area Network (WAN), the Internet, or any combination thereof. In one embodiment, network 124 is further coupled to a computing device 125 such that computing device 100 and computing device 125 may communicate over network 124.

The computing device 100 also includes non-volatile storage 105 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

The mass storage 112 may include, but is not limited to, a magnetic disk drive, such as a hard disk drive, a magnetic tape drive, an optical disk drive, or the like. It is appreciated that instructions executable by processor 102 may reside in mass storage 112, memory 104, non-volatile storage 105, or may be transmitted or received via network interface 114.

In one embodiment, the computing device 100 may execute an Operating System (OS). Embodiments of an OS include Microsoft Windows®, the Apple Macintosh operating system, the Linux operating system, the Unix operating system, or the like.

The computing device 100 may also execute a dynamic binary translator 130. The dynamic binary translator 130 may translate and optimize binary code at runtime for compatibility and performance improvement. The dynamic binary translator 130 may identify frequently executed code of a program which may be also referred to as hot traces. The dynamic binary translator 130 may further translate one or more of the hot traces into transactional memory regions to dynamically optimize one or more portions of the running program.

The transactional memory regions provide a concurrency control mechanism similar to database transactions for controlling access to shared memory. Transactional memory regions may be implemented using hardware transactional memory and/or software transactional memory. In software transactional memory, the transaction memory regions comprise a series of reads and writes to shared memory. These reads and writes logically occur at a single instant in time in that intermediate states are not visible to other successful transactions. Transaction memory regions are optimistic in that all threads complete modifications to shared memory without regard to other threads, but recording every read and write that the thread makes in a log. Instead of placing the onus on the writer to make sure it does not adversely affect other operations in progress, transaction memory regions place the onus on the reader. The reader after completing an entire transaction verifies that other threads have not concurrently made changes to memory that it accessed in the past. In particular, the transaction memory regions have a commit operation in which the changes of a transaction are validated and, if validation is successful, made permanent. The transaction memory regions may also execute an abort operation if a transaction cannot be committed due to conflicting changes or as indicated below early exit from a hot trace. In hardware transactional memory, the transactional memory regions operate in a manner similar to above except hardware actively checks conflict between both writers and readers at memory access time. By packaging hot traces into transaction memory regions, the dynamic binary translator 130 may dynamically optimize existing binary programs and more fully utilize processing power of computing devices 100 that provide multiple processing cores.

The dynamic binary translator 130 may also perform one or more optimization techniques on the identified hot traces based on runtime profiling information. It should be appreciated that the "optimized" code resulting from the one or more optimization techniques does not necessarily result in "optimal" code or code that could not be further improved. The optimization techniques attempt to generate better code based upon some performance category of interest such as bettering the code's memory use, execution time, cache performance, and the like. Such optimization techniques, however, may in fact result in optimized code that performs worse in one or more of the categories of interest than the original code.

Figure 2:
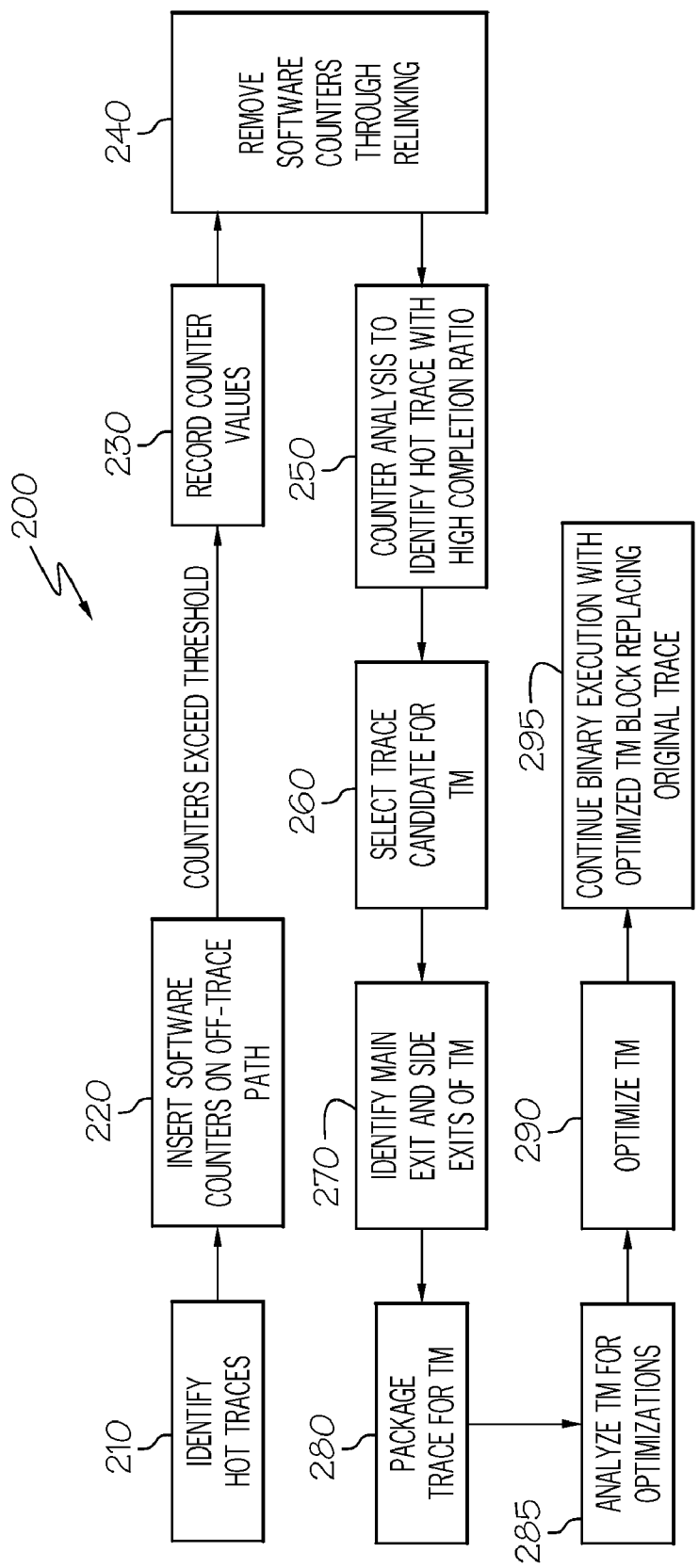
FIG. 2 shows aspects of a dynamic translation process of the dynamic binary translator of FIG. 1.

Referring now to FIG. 2, aspects of binary translation process 200 of the dynamic binary translator 130 are shown. The dynamic binary translator 130 at block 210 may identify hot traces of the binary code. The dynamic binary translator 130 may use a most recent execution tail (MRET) approach to identify hot traces of the binary code. In the MRET approach, hot trace heads are first identified based on profiling information. In one embodiment, each loop head (e.g., a backward branch target) is treated as a candidate trace head. Each candidate trace head is instrumented such that a counter is incremented after each execution of the candidate trace head. When the counter exceeds a certain threshold, the candidate trace head becomes a hot trace head. Then, the dynamic binary translator 130 may select the hot trace as the execution path from the hot trace head to the most recent execution tail. In another embodiment, the dynamic binary translator 130 may use a two-pass MRET (MRET$^2$) approach. In the MRET$^2$ approach, the hot trace is not simply selected as the execution path from a hot trace head to the most recent execution tail. Instead, hot traces are selected from at least two passes of the MRET approach. In the first pass, the MRET approach is used to select one trace as a potential hot trace. A performance counter is then cleared, the counter is restarted, and another potential hot trace is selected using the MRET in the second pass. Thus, two potential hot traces are identified with the same hot trace head but possible different trace tails. The different trace tails indicate that even though the trace head is hot, the trace tails may not be hot. Embodiments of the MRET$^2$ approach select the hot trace as the common path of the two potential hot traces, which is likely to have both a hot head and a hot tail. Additional details regarding the MRET$^2$ approach are provided in copending U.S. patent application Ser. No. 11/241,527.

After identifying the hot traces of the binary code, the dynamic binary translator 130 at block 220 may insert software counters in off-trace paths that increment each time their respective off-trace code is executed. As shown in FIG. 3-6, hot code traces may have one or more exits 310 from the hot code trace. The dynamic binary translator 130 may insert software counters in the off-trace code associated with each of these one or more exits 310 to obtain runtime metrics for the hot code traces via the off-trace paths. By placing the software counters in the off-trace paths, the runtime performance of the binary code is not generally effected by the dynamic binary translator 130 gathering runtime metrics as such metrics are gathered in off-trace paths and not the hot traces which account for a large portion of the execution time of the binary code.

In response to one or more software counters exceeding a threshold value, the dynamic binary translator 130 may record the software counter values at block 230 in order to retain the runtime metrics associated with the hot traces. Furthermore, the dynamic binary translator 130 at block 240 may remove the software counters. For example, the dynamic binary translator 130 may remove the software counters through relinking of the binary code or via other techniques.

At block 250, the dynamic binary translator 130 may analyze the gathered performance metrics to identify hot traces with high completion ratios. The dynamic binary translator 130 at block 260 may select hot traces that have high completion ratios. In one embodiment, the dynamic binary translator 130 may select hot traces that have a completion ratio that has a predetermined relationship to a threshold value. For example, the dynamic binary translator 130 may select hot traces that have a completion ratio of at least a 90%.

At block 270, the dynamic binary translator 130 may identify a main exit and side exits of the hot trace. As depicted in FIGS. 3-6, a hot trace may have one or more exits 310, 320. The dynamic binary translator 130 may label the most frequently executed exit as the main exit 320 of the hot trace and the other exits as side exits 320 of the trace.

The dynamic binary translator 130 at block 280 may package the hot trace 280 based upon the identified main exit 320 and side exit 310. As shown in Table 1, the dynamic binary translator may package the hot traces 280 based upon the type of hot trace. In particular, a Group 1 trace corresponds to a hot trace that has no back edge and thus does not form a loop and has at least a threshold number of instructions (e.g. 20). An example of a Group 1 trace is shown in FIG. 3. Moreover, as shown in FIG. 3 the dynamic binary translator 130 may associate a transaction start with the beginning of the hot trace, a transaction commit with the end or main exit 320 of the hot trace, and a transaction abort with any side exits 310. In one embodiment, the dynamic binary translator 130 may associate the transaction abort with a branch instruction by changing the target of the branch instruction to a transaction abort stub label. The transaction abort stub may include instructions that abort the transaction.

TABLE 1

| Group | Signatures | Packaging |
|---|---|---|
| 1 | Trace Size >=20 Instructions no back edge (no loop) | TM_START: begin of trace TM_COMMIT: end of trace TM_ABORT: any side exit(s) on trace |
| 2 | Trace Size >=20 Instructions Has unconditional back edge (unconditional loop) | TM_START: immediately before the back edge's branch target TM_COMMIT: the exit(s) on trace with the highest off-trace counter value TM_ABORT: any other exit(s) within the back edge covered area on trace |
| 3 | Trace Size >=20 Instruction Has conditional back edge (conditional loop) | TM_START: immediately before the back edge's branch target TM_COMMIT: immediately after the back edge's branch source TM_ABORT: any side exit(s) on trace |
| 4 | Trace Size <20 Instructions Has either conditional or unconditional back edge (loop) | Unroll a certain factor such that the unrolled trace size reaches 20 Instructions Match Group 2 or Group 3, depending on its back edge type, and use respective packaging scheme |

Group 2 corresponds to a hot trace that has an unconditional back edge thus forming an unconditional loop and at least a threshold number of instructions (e.g. 20). An example of a Group 2 trace is shown in FIG. 4. As shown in FIG. 4, the trace includes an unconditional branch or jump instruction 330 that targets a prior instruction 340 of the hot trace thus forming an unconditional loop between instructions 330, 340. The dynamic binary translator 130 in response to identifying a Group 2 trace may associate a transaction start with an instruction 345 that is before the target instruction 340 of the unconditional branch 330. The dynamic binary translator 130 further associates a transaction commit with the main exit 320 of the hot trace, and a transaction abort with any side exits 310.

Group 3 corresponds to a hot trace that has a conditional back edge thus forming a conditional loop and at least a threshold number of instructions (e.g. 20). An example of a Group 3 trace is shown in FIG. 5. As shown in FIG. 5, the trace includes a conditional branch or jump instruction 370 that targets a prior instruction 375 of the hot trace thus forming an conditional loop between instructions 370, 375. The dynamic binary translator 130 in response to identifying a Group 3 trace may associate a transaction start with an instruction 380 that is before the target instruction 375 of the conditional branch 370. The dynamic binary translator 130 further associates a transaction commit with the main exit 320 of the hot trace which is the instruction following the conditional branch 370, and a transaction abort with any side exits 310.

Group 4 corresponds to a hot trace that has a conditional back edge or an unconditional back edge thus forming a conditional loop or an unconditional loop but has less than a threshold number of instructions (e.g. 20). An example of a Group 4 trace is shown in FIGS. 6A and 6B. As shown in FIGS. 6A and 6B, the trace includes a branch or jump instruction 390 that targets a prior instruction 395 of the hot trace thus forming a loop between instructions 390, 395. The dynamic binary translator 130 in response to identifying a Group 4 trace may unroll the loop a certain factor of times (e.g. 4) to obtain a trace having at least the threshold number of instructions (e.g. 20). FIG. 6A shows the Group 4 trace prior to unrolling the loop and FIG. 6B shows the Group 4 trace after unrolling the loop. After unrolling the loop, the dynamic binary translator 130 may handle the unrolled loop in the manner similar to a Group 2 or Group 3 trace.

Referring back to FIG. 2, the dynamic binary translator 130 after packaging the hot traces in transaction memory regions may analyze the transaction memory regions at block 285 and optimize the transaction memory regions at block 290 based upon the analysis. Since the binary codes are generally produced by optimizing compilers with highest optimization level turned on, the dynamic binary translator 130 may utilize optimizations that are unlikely to conflict with the optimizations of the static optimizing compiler used to produce the original binary code. In one embodiment, the dynamic binary translator 130 includes a single pass optimizer that covers many different types of optimizations. In particular, the optimizer may perform Local Value Numbering (LVN) optimizations. Local Value Numbering optimizations natively covers Copy Propagation (CP) optimizations, Constant Subexpression Elimination (CSE) optimizations and Dead Code Elimination (DCE) optimizations in a single pass. Further, the optimizer implements the LVN optimizations without a Control Flow Graph (CFG) or Data Flow Analysis (DFA) thus reducing overhead associated with the dynamic optimizations of the dynamic binary translator 130.

Finally, after optimizing the transaction memory regions, the dynamic binary translator 130 may replace the original hot traces with the optimized transaction memory regions at block 295. Accordingly, the computing device 100 may continue with the execution of the binary program and the optimized transaction memory regions. In particular, multiple threads of the computing device 100 may execute the optimized transaction memory regions in parallel thus resulting in fuller usage of the multiple cores of the computing device 100 than the original binary.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A non-transitory machine readable storage medium storing a plurality of instructions that, in response to being executed, result in a computing device dynamically translating portions of a compiled program to transactional memory regions, and executing the transactional memory regions, wherein dynamically translating portions of the compiled program comprises
    identifying a hot code trace of the compiled program in response to executing the compiled program,
    identifying a beginning, an end and one or more side exits of the hot code trace,
    associating a transaction abort with each of the one or more side exits,
    determining a completion ratio for the hot code trace in response to executing the compiled program, and
    packaging the hot code trace into a set of operations whose results are to be committed atomically in response to the completion ratio having a predetermined relationship to a threshold ratio.

2. The machine readable medium of claim 1 wherein the plurality of instructions further result in the computing device
    identifying the one ore more side exits correspond to off-trace blocks, and
    placing counters in the off-trace blocks to track the completion ratio of the hot code trace.

3. The machine readable medium of claim 1 wherein the plurality of instructions further result in the computing device performing one or more code optimizations on the hot code trace.

4. The machine readable medium of claim 1 wherein the plurality of instructions further result in the computing device
    identifying an unconditional branch that targets a prior instruction of the hot code trace,
    identifying a most taken exit from the hot code trace, and other exits from the hot code trace,
    associating a transaction start with an instruction before the instruction targeted by the unconditional branch, and
    associating a transaction commit with the most taken exit from the hot code trace.

5. The machine readable medium of claim 1 wherein the plurality of instructions further result in the computing device
    identifying a conditional branch that targets a prior instruction of the hot code trace,
    identifying exits from the hot code trace,
    associating a transaction start with an instruction before the instruction targeted by the conditional branch, and
    associating a transaction commit with an instruction after the conditional branch.

6. The machine readable medium of claim 1 wherein the plurality of instructions further result in the computing device unrolling a loop of the hot code trace if the hot code trace comprises less than a threshold number of instructions.

7. The machine readable medium of claim 1 wherein the plurality of instructions further result in the computing device packaging the hot code trace in response to the completion ratio for the hot code trace being at least 90 percent.

8. The non-transitory machine readable storage medium of claim 1, wherein associating the transaction abort with each of the one or more side exits comprises changing a target of a branch instruction included in the hot code trace.

9. The non-transitory machine readable storage medium of claim 1, wherein associating the transaction abort with each of the one or more side exits comprises aborting a commit operation corresponding to the hot code trace.

10. The non-transitory machine readable storage medium of claim 1, wherein associating the transaction abort with each of the one or more side exits comprises aborting validation of changes included in the hot code trace.

11. A computing device, comprising
    a processor, and
    a non-transitory machine readable storage medium storing a plurality of instructions that in response to being executed result in the processor:
        identifying a hot code trace of a program,
        determining a completion ratio for the hot code trace,
        packaging the hot code trace into a transactional memory region in response to the completion ratio having a predetermined relationship to a threshold ratio,
        identifying a beginning, an end and one or more side exits of the hot code trace,
        associating a transaction start of the transaction memory region with the beginning of the hot code trace,
        associating a transaction commit of the transaction memory region with the end of the hot code trace, and
        associating a transaction abort of the transaction memory region with each of the one or more side exits.

12. The computing device of claim 11, wherein the plurality of instructions, in response to being executed, further result in the processor performing one or more code optimizations on the hot code trace of the transactional memory region.

13. The computing device of claim 12, wherein the plurality of instructions, in response to being executed, further result in the processor
    identifying a conditional branch that targets a prior instruction of the hot code trace, associating the transaction start of the transaction memory region with an instruction before the instruction targeted by the conditional branch, and associating the transaction commit of the transaction memory region with an instruction after the conditional branch.

14. The computing device of claim 12, wherein the plurality of instructions, in response to being executed, further result in the processor associating each of the one or more side exits with off-trace blocks, placing counters in the off-trace blocks, and tracking the completion ratio of the hot code trace based on the counters.

15. A computing device, comprising:

a processor, and a non-transitory machine readable storage medium storing a plurality of instructions, that in response to being executed, result in the processor:

identifying a hot code trace of a program, determining a completion ratio for the hot code trace, packaging the hot code trace into a transactional memory region in response to the completion ratio having a predetermined relationship to a threshold ratio, identifying an unconditional branch that targets a prior instruction of the hot code trace, identifying a most taken exit from the hot code trace, and other exits from the hot code trace, associating a transaction start of the transaction memory region with an instruction before the instruction targeted by the unconditional branch, associating a transaction commit of the transaction memory region with the most taken exit from the hot code trace, and associating a transaction abort of the transaction memory region with each of the other exits from the hot code trace.

16. The computing device of claim 15, wherein the hot code trace includes the unconditional branch.

17. The computing device of claim 15, wherein the transaction commit includes validating a change to the transaction memory region.

18. The computing device of claim 17, wherein the transaction abort is based on a failure to validate a change to the transaction memory region.

* * * * *

UNITED STATES PATENT AND TRADEMARK OFFICE
CERTIFICATE OF CORRECTION

| | | |
|---|---|---|
| PATENT NO. | : 8,296,749 B2 | Page 1 of 1 |
| APPLICATION NO. | : 11/966453 | |
| DATED | : October 23, 2012 | |
| INVENTOR(S) | : Chengyan Zhao et al. | |

It is certified that error appears in the above-identified patent and that said Letters Patent is hereby corrected as shown below:

Col. 7:
Line 56, "ore" should be --or--.

Signed and Sealed this
Twenty-fifth Day of December, 2012

David J. Kappos
*Director of the United States Patent and Trademark Office*